(12) United States Patent
Biswas et al.

(10) Patent No.: US 9,749,853 B2
(45) Date of Patent: Aug. 29, 2017

(54) LOCATION IDENTIFICATION (71) Applicant: Nokia Technologies Oy, Espoo (FI)

(72) Inventors: Debmalya Biswas, Lausanne (CH); Julian Nolan, Pully (CH); Matthew Lawrenson, Bussignypres-de-lausanne (CH)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/877,017

(22) Filed: Oct. 7, 2015

(65) Prior Publication Data
US 2016/0112868 A1 Apr. 21, 2016

(30) Foreign Application Priority Data
Oct. 17, 2014 (GB) .................................. 1418413.9

(51) Int. Cl.
*H04W 12/02* (2009.01)
*H04W 4/02* (2009.01)
*H04L 29/08* (2006.01)

(52) U.S. Cl.
CPC ............. *H04W 12/02* (2013.01); *H04L 67/18* (2013.01); *H04W 4/02* (2013.01); *H04W 4/021* (2013.01); *H04W 4/025* (2013.01)

(58) Field of Classification Search
CPC ....... H04W 12/02; H04W 4/02; H04W 4/008; H04W 4/025; H04W 4/206; H04W 52/0254; H04W 52/0251; H04L 51/20; G06Q 30/0245; H04M 1/0233; G06F 1/163; G06F 3/0346; G06F 1/1649
(Continued)

(56) References Cited

U.S. PATENT DOCUMENTS 8,589,330 B2  11/2013  Petersen et al.
8,719,198 B2   5/2014  Zheng et al.
(Continued)

FOREIGN PATENT DOCUMENTS

WO   2013/056407 A1   4/2013

OTHER PUBLICATIONS

Extended European Search Report for corresponding European Patent Application No. 15184590.6, dated Dec. 9, 2015, 6 pages.
(Continued)

*Primary Examiner* — Phuoc H Doan
(74) *Attorney, Agent, or Firm* — Locke Lord LLP (57) ABSTRACT

A method comprises receiving an indication of an activity to be performed, obtaining an indication of a current location of a user, transmitting, to a server, information relating to an area in which the location for the activity is to be identified, said information including the current location and one or more criteria relating to activity type and/or required privacy level, receiving, from the server, location information identifying one or more candidate locations for the activity. If a suitable candidate location cannot be identified within the area, further information regarding the candidate locations may be obtained, and comments regarding future conditions or shortcomings of the candidate location may be displayed, or the activity may be divided into two or more sub-tasks to be performed at different locations. The user's progress in performing the activity may be monitored, so that the displayed candidate locations can be updated.

27 Claims, 6 Drawing Sheets

(58) Field of Classification Search
USPC ......... 455/411, 410, 418, 414.1; 340/539.22, 340/856.3; 345/158; 726/26
See application file for complete search history.

(56) References Cited

U.S. PATENT DOCUMENTS

| | | |
|---|---|---|
| 2007/0005419 A1 | 1/2007 | Horvitz et al. |
| 2010/0064373 A1* | 3/2010 | Cai .................. G06F 21/6254 726/26 |
| 2013/0178233 A1 | 7/2013 | McCoy et al. |
| 2013/0254900 A1 | 9/2013 | Sathish et al. |
| 2013/0298248 A1 | 11/2013 | Boldrev et al. |
| 2013/0324160 A1 | 12/2013 | Sabatellil et al. |
| 2014/0289850 A1 | 9/2014 | Yu et al. |
| 2014/0308970 A1 | 10/2014 | Klemm et al. |

OTHER PUBLICATIONS

Fukazawa et al., "Situation-Aware Task-Based Service Recommendation", 4th International Conference on Mobile Systems, Applications and Services, 2006, 2 pages
Kannan et al., "Low Cost Crowd Counting Using Audio Tones", Proceedings of the 10th ACM Conference on Embedded Network Sensor Systems, Nov. 6-9, 2012, pp. 155-168.
Search Report for corresponding United Kingdom Patent Application No. 1418413.9, dated Mar. 5, 2015, 3 pages.
EP Communication dated Jan. 24, 2017 for European Patent Application No. 15184590.6, 5 pages.

* cited by examiner

LOCATION IDENTIFICATION

FIELD OF THE INVENTION

This disclosure relates to identifying a location suitable for a predetermined activity, based on multiple criteria. In particular, the present invention relates to providing at least one candidate location for the activity based, at least in part, on real-time data relating to the candidate location.

BACKGROUND

In recent years, portable and hand-held electronic communication devices have become common in many countries. The increasing sophistication of such devices permit a wider range of activities to be carried out in public places.

For example, some years ago, a user wishing to send an e-mail would be likely to do so from a computer with a wired connection to a communication network such as the Internet from their home or place of work. With the improved data networks and wireless connections available today, that user may instead send an e-mail from their mobile telephone, tablet computer or laptop computer, for example, while travelling on a public transportation service.

However, such use of portable communication devices in public places for sending e-mails or for making telephone calls may compromise the privacy of the user. For example, it may be possible for another person to overhear a telephone conversation or to look over the user's shoulder while they type an e-mail. In particular, if the user is unfamiliar with their current location and its surrounding area, they may experience difficulty in finding a location in which information can be communicated by e-mail or telephone without potentially risking a loss of confidentiality of the information and privacy.

SUMMARY

According to a first aspect, a method includes receiving an indication of an activity to be performed by a user, obtaining an indication of a current location of the user, transmitting, to a server, information relating to an area in which the location for the activity is to be identified, said information including the current location, and one or more criteria relating to at least one of: a type of the activity and a level of privacy for the activity, receiving, from the server, location information identifying one or more candidate locations for the activity, and presenting information identifying at least one of said one or more candidate locations to the user.

Said transmitting may include generating a query including said information and transmitting said query to the server.

The one or more criteria may include an urgency for said activity. In an embodiment where said urgency is indicated by a time period for performance of the activity, the method may also include determining a current speed of motion or a form of transport being used by the user and identifying said area based on the desired time period and the determined current speed of motion or form of transport.

The method may include determining whether the activity has been completed, if the activity has not been completed, obtaining an updated current location for the user, determining whether the one or more candidate locations should be changed, based on said current location and a time period for completing the activity and, if it is determined that the one or more candidate locations should be changed, determining one or more new candidate locations and presenting updated location information identifying the one or more new candidate locations to the user.

According to a second aspect, a method includes a server receiving, from a device, information relating to an area in which a location for a predetermined activity is to be identified, said information including a current location of a user, and one or more criteria relating to at least one of: a type of the activity and a level of privacy for the activity, the server querying a map database to determine one or more candidate locations meeting at least one of said one or more criteria, based on said current location, and the server transmitting information regarding said one or more candidate locations to the device.

The information may include at least one of an indication of a time period for performance of the activity, an indication of an urgency of the predetermined activity and a distance limit from the current location.

Any of the above methods according to the first or second aspect may include calculating a space requirement for the activity, based on at least one of the type of the activity and the level of privacy for the activity.

Any of the above methods according to the first or second aspect may include the server accessing a database to obtain further information regarding the one or more candidate locations, and selecting the at least one candidate location from the one or more candidate locations, based at least in part on said further information. For example, the further information may include real-time information, such as weather information, traffic information and/or information regarding a number density of people at the one or more locations. Alternatively, or additionally, said further information may include information regarding future conditions at the one or more candidate locations, in which case the method may include selecting the at least one candidate location from the one or more candidate locations if it is determined that the one or more criteria will be met, based at least in part on said information regarding future conditions, wherein said presenting information comprises presenting a comment regarding a time at which said one or more criteria will be met at the at least one candidate location, based on said future conditions. Such future information may include one or more of a weather forecast, event schedule information and public transportation schedule information.

If none of said one or more candidate locations meets each of the one or more criteria, the at least one candidate location may be selected based on the number of the one or more criteria met, wherein said presenting information comprises presenting a comment regarding one of the one or more criteria not met by the at least one candidate location. In another embodiment, if none of said one or more candidate locations meets each of the one or more criteria, the method may include selecting at least two candidate locations that collectively meet the one or more candidate locations, wherein said presenting information comprises presenting comments regarding parts of the predetermined activity that can be performed at each of the selected candidate locations, based on the one or more criteria met individually by the selected candidate locations.

Also provided is a computer program comprising computer readable instructions which, when executed by a processor arrangement, cause said processor arrangement to perform a method according to the first or second aspect. The computer program may be included in a software application, or "app", for a smartphone or a computer.

Also provided is a non-transitory computer-readable medium on which is stored computer-readable instructions that, when executed by a processing arrangement, cause the processing arrangement to perform any of the above methods according to the first or second aspect.

According to a third aspect, an apparatus includes an input module configured to receive input from a user indicating an activity to be performed, a wireless communications module, a location module configured to provide an indication of a current location of the apparatus, a processor arrangement, and a memory comprising computer-readable instructions which, when executed by the processor arrangement, cause the processor arrangement to transmit, to a server, via the wireless communications module, information relating to an area in which the location for the activity is to be identified, said information including the current location, and one or more criteria relating to at least one of: a type of the activity and a level of privacy for the activity, receive, from the server, information identifying one or more candidate locations for the activity, and an output configured to present information identifying said at least one of said one or more candidate locations to the user.

In some embodiments, the apparatus is a portable electronic apparatus, such as a smartphone or tablet computer.

The computer-readable instructions may be configured to cause the processor arrangement to generate a query including said information for transmission to the server.

The one or more criteria may include an urgency for said activity. In one example, where the urgency is based on a received indication of a time period for performance of the activity, and the computer-readable may cause the processor arrangement to determine a current speed of motion or a form of transport being used by the user and identify said area based on the desired time period and the determined current speed of motion or form of transport.

The computer-readable instructions may be configured to cause the processor arrangement to determine whether the activity has been completed, if the activity has not been completed, obtain an updated current location for the user, determine whether the one or more candidate locations should be changed, based on said current location and a time period for completing the activity, and if it is determined that the one or more candidate locations should be changed, determine one or more new candidate locations and presenting updated location information identifying the one or more new candidate locations to the user.

The computer-readable instructions may be configured to cause the processor arrangement to calculate a space requirement for the activity, based on at least one of the type of the activity and the level of privacy for the activity, wherein the one or more criteria includes said space requirement.

The computer-readable instructions may be configured to cause the processor arrangement to, if none of said one or more locations meets each of the one or more criteria, present via the output comments regarding future conditions at the at least one of said one or more candidate locations to the user. The comments regarding future conditions may be based on at least one of weather information and public transportation schedule information.

The input module may be configured to receive an indication of a distance limit and the computer-readable instructions comprise instructions to cause the processor arrangement to define the area based on said distance limit.

The computer-readable instructions may be configured to cause the processor arrangement to, if none of said one or more candidate locations meets each of the one or more criteria, select the at least one candidate location based on the number of the one or more criteria met and present, via the output, a comment regarding one or more criteria not met by the at least one candidate location or, in another embodiment, select at least two candidate locations of the one or more candidate locations, where the one or more criteria are met, collectively, by the selected candidate locations and present, via the output, comments regarding parts of the predetermined activity that can be performed at each of the selected candidate locations based on the one or more criteria met by the individual selected candidate locations.

This aspect also provides a system comprising such an apparatus and the server.

The server may be configured to access a database to obtain real-time information regarding the one or more candidate locations and one of said apparatus and said server configured to select the at least one candidate location from the one or more candidate locations, based at least in part on said real-time information.

The server may be configured to access a database to obtain schedule information regarding the one or more candidate locations and one of said apparatus and said server configured to select the at least one candidate location from the one or more candidate locations, based at least in part on said schedule information.

The server may be configured to access a database to obtain information regarding future conditions at the one or more candidate locations and one of said apparatus and said server is configured to select the at least one candidate location from the one or more candidate locations, based at least in part on said future conditions, where the apparatus is configured to present a comment regarding a time at which said one or more criteria might be met, based on said future conditions.

One of said apparatus and said server may be configured to, if none of the one or more candidate locations meet each of the one or more criteria, select the at least one candidate location from the one or more candidate locations and said apparatus configured to present a comment regarding one of the one or more criteria not met by the selected candidate location.

One of said apparatus and said server may be configured to, if none of the one or more candidate locations meet each of the one or more criteria, select at least two candidate locations from the one or more candidate locations, wherein each of the one or more criteria is met collectively by the selected candidate locations and said apparatus configured to present a comment regarding a part of the activity that may be performed at each of the selected candidate locations, based on the one or more criteria met individually by the selected candidate locations.

According to a fourth aspect, an apparatus includes a processor arrangement, an input, an output and a memory comprising computer-readable instructions which, when executed by the processor arrangement, cause the processor arrangement to receive, from the device, information relating to an area in which a location for a predetermined activity is to be identified, said information including a current location of a user, and one or more criteria relating to at least one of: a type of the activity and a level of privacy for the activity, via the input, query a map database to determine one or more candidate locations meeting at least one of said one or more criteria, based on said current location, and transmit information regarding said one or more candidate locations to the device via the output.

The information may include at least one of an indication of a time period for performance of the activity, an indication of an urgency of the predetermined activity and a distance limit from the current location.

The computer-readable instructions may be configured to cause the processor arrangement to calculate a space requirement for the activity, based on at least one of the type of the activity and the level of privacy for the activity, wherein the one or more criteria includes said space requirement.

According to a fifth aspect, an apparatus includes an input module configured to receive input from a user indicating an activity to be performed, a location module configured to provide an indication of a current location of the apparatus, a query generator configured to generate a query including information relating to an area in which the location for the activity is to be identified, and one or more criteria relating to at least one of: a type of the activity and a level of privacy for the activity, a communications module configured to transmit said query to a server via a network and to receive, from the server, information identifying at least one candidate location for the activity, based on the area and the one or more criteria in the query, and an output configured to present information identifying said location to the user.

BRIEF DESCRIPTION OF THE DRAWINGS

Example embodiments of the invention will now be described with reference to the accompanying figures, of which.

DETAILED DESCRIPTION

Figure 1:
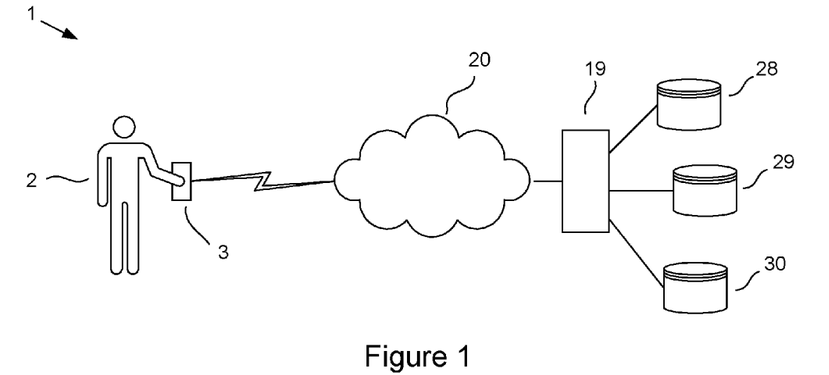
FIG. 1 depicts a system for identifying a location for an activity, according to an embodiment.

FIG. 1 depicts a system 1 according to an embodiment, configured to identify a location for an activity to be performed by a user 2 of a portable computing device 3.

Figure 2:
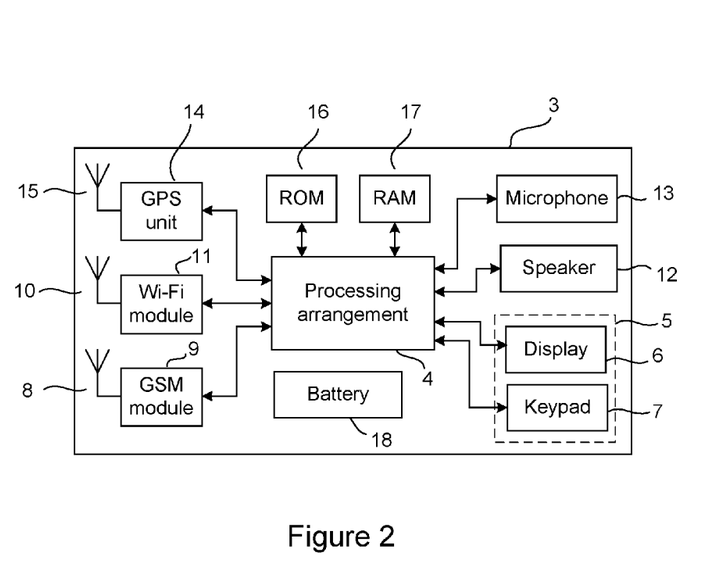
FIG. 2 is a block diagram of a portable computing device in the system of FIG. 1.

As shown in FIG. 2, the device 3 includes a processing arrangement 4, which controls the operation of various components of the device 3. The processing arrangement 4 includes one or more micro-processors or similar.

The device 3 also includes a user interface 5, including a display 6 and an input 7, such as a touchpad or keyboard. In some embodiments, the user interface 5 is a touchscreen, in which the input 7 is integrated into the display 6.

In this particular example, the device 3 is a smartphone and includes an antenna 8 and a cellular transceiver 9 for telephone and data services. In this particular example, the cellular transceiver 9 is a module configured for Global System for Mobile Communications (GSM) communications and includes a Subscriber Identification Module (SIM) card holder (not shown). However, in other embodiments, the cellular transceiver 9 may instead by configured for use with a Code Division Multiple Access (CDMA) system or other type of cellular system. One or more further antennas 10 and transceivers 11 may be provided for access to other wireless communication networks, such as Wi-Fi networks, Bluetooth® networks and so on. A speaker 12 and a microphone 13 are also provided, to allow for audio output and input respectively.

Also, in this particular example, the device 3 includes a Global Positioning System (GPS) unit 14 and antenna 15 arranged to obtain a determination of a current location of the device 3.

The device 3 includes memory units, such as Read-Only Memory (ROM) 16 and Random Access Memory (RAM) 17, which store software for execution by the processing arrangement 4 and other data, and is powered by a rechargeable battery 18.

Returning to FIG. 1, the device 3 can communicate with other apparatuses, such as a server 19, over the Internet 20, for example, using the cellular transceiver 9 and antenna 8 via a cellular network (not shown) or another transceiver 11 and antenna 10 via a wireless communications network (not shown).

Figure 3:
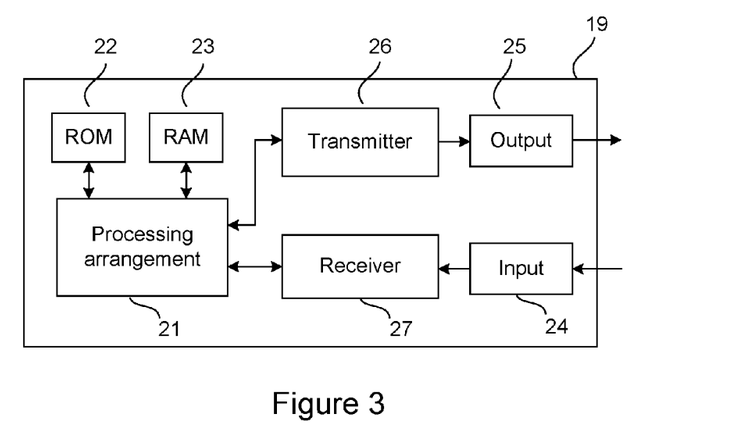
FIG. 3 is a block diagram of a server in the system of FIG. 1.

As shown in FIG. 3, the server 19 includes a processing arrangement 21, that has one or more microprocessors or similar and memory units 22, 23. The server 19 also includes input ports 24, output ports 25, a transmitter 26 and a receiver 27 to permit communication with other apparatuses, such as communications via the Internet 20 with the device 3.

The server 19 is configured to access data stored in one or more databases 28, 29, 30. Depending on the embodiment, such databases 28, 29, 30 may be located within the server 19, accessible by the server 19 via a local area network (not shown) or accessible via the Internet 20.

Figure 4:
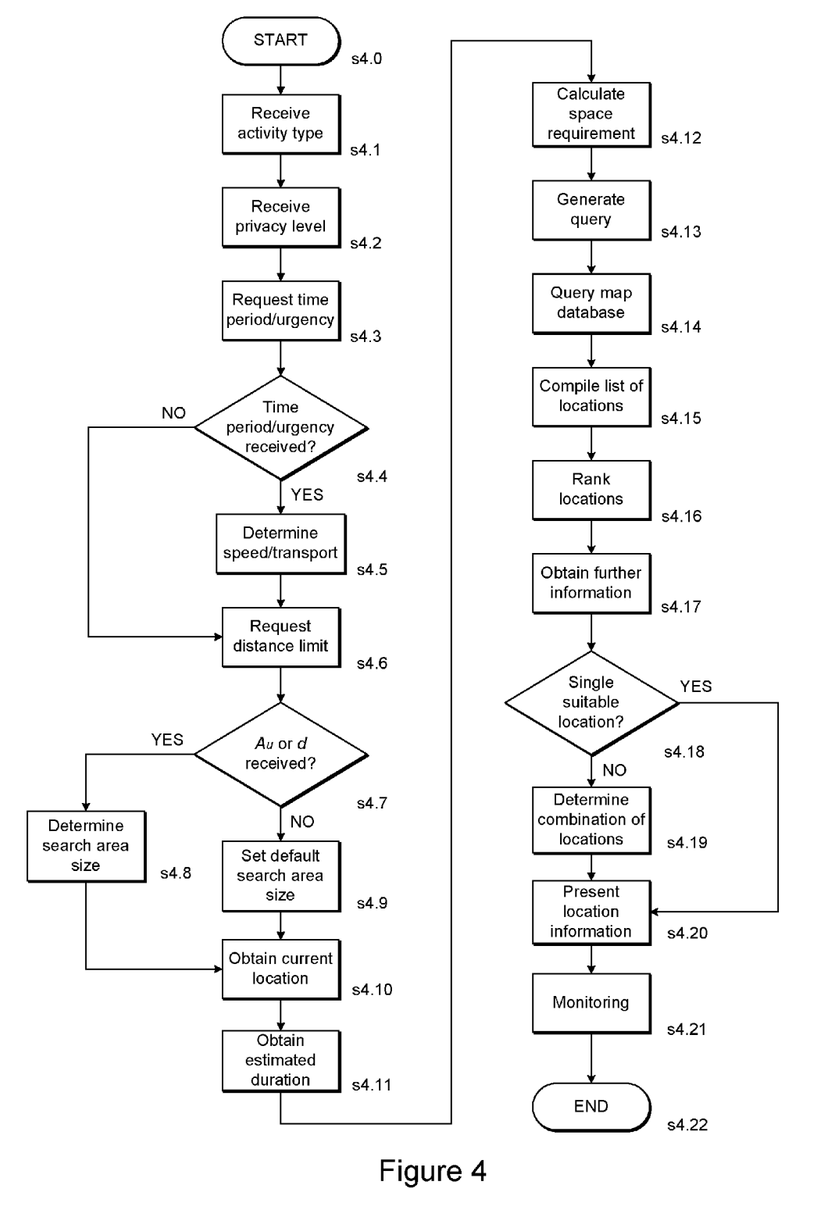
FIG. 4 is a flowchart of a method according to an embodiment, that may be performed by the system of FIG. 1.

A method that may be performed by the system 1 will now be described, with reference to FIG. 4, to provide one or more recommended locations for an activity to be performed by the user 2. In this particular example, the device 3 performs certain parts of the method of FIG. 4 under the control of a smartphone "app" executed by the processing arrangement 4.

Starting at s4.0, for example, when the user 2 opens the "app", the device 3 receives input from the user 2 via the input 7 of the user interface 5. FIGS. 5, 6, 7 and 8 depict examples of information presented on the display 6.

Figure 5:
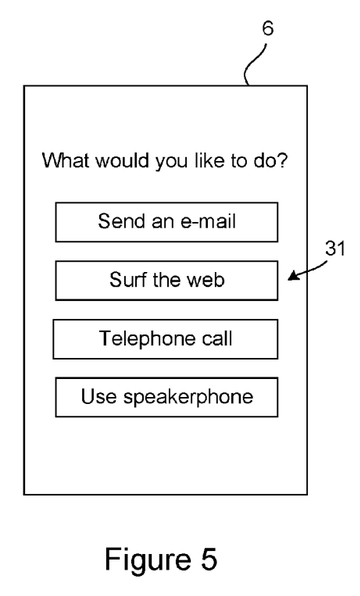
FIG. 5 depicts an example of a first user input screen that may be displayed by the device of FIG. 2.

In this particular example, the user 2 is invited to identify the type $A_y$ of activity to be performed. As shown in FIG. 5, the user 2 may select a type $A_y$ of activity from a list 31 presented on the display 6 to provide an indication of the activity type (s4.1). Alternatively, the user may be invited to type in information identifying the activity type $A_y$ or to say the activity type $A_y$ into the microphone 13 to be received by the user interface 5.

Figure 6:
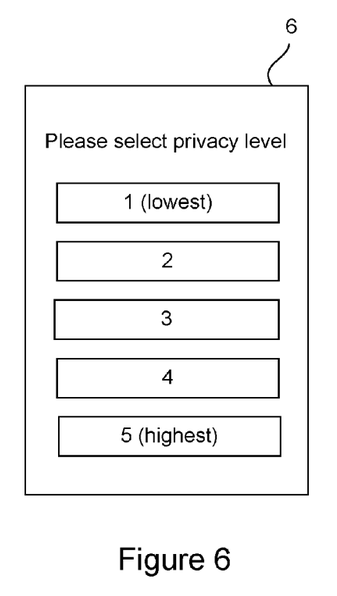
FIG. 6 depicts an example of a second user input screen that may be displayed by the device of FIG. 2.

Instead of, or in addition to, providing information regarding the activity type $A_y$, the user may input a desired privacy level $A_c$. An example input screen is shown in FIG. 6, where the user is asked to select a privacy level $A_c$ based on a scale of 1 to 5 to be received by the user interface (s4.2). Again, the user may instead be asked to input a number or character corresponding to the desired privacy level $A_c$ using the keypad 7 or to say the number or character.

Figure 7:
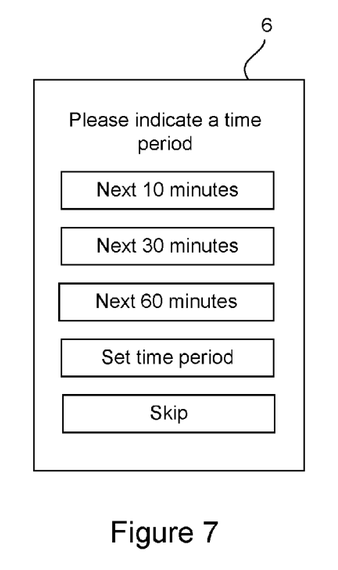
FIG. 7 depicts an example of a third user input screen that may be displayed by the device of FIG. 2.
Figure 8:
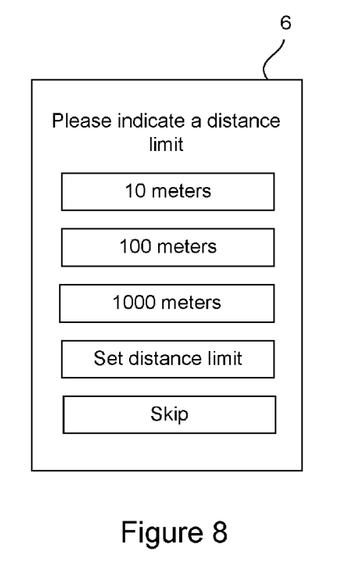
FIG. 8 depicts an example of a fourth user input screen that may be displayed by the device of FIG. 2.

In this particular embodiment, the user 2 is also invited to input a time period $A_u$ during which the user wishes to perform the activity (s4.3). An example input screen is shown in FIG. 7, where the user is asked to select a time period $A_u$ from a list and given the option to type in an alternative time period $A_u$ using the keypad 7. Alternatively, the user may instead be asked to say the time period into the microphone 13. In another embodiment, the user may be asked to select an urgency level, from which a desired time period $A_u$ can be determined, for example, based on a lookup table stored in the device 3.

If a time period $A_u$ is received by the user interface 5 of the device 3 (s4.4), then the processing arrangement 4 may obtain an estimate of the speed of motion of the user 2 (s4.5). For example, the processing arrangement 4 may utilise data from the GPS unit 14 or other sensors (not shown) in the device 3 to whether the user 2 is in motion, for example, in a car or in another form of transport. Alternatively, the user 2 may be invited to select one or more available modes T of transportation from a list (not shown), from which a distance limit may be determined.

Alternatively, or additionally, the user may be invited to input a distance limit d indicating how far they are willing to travel to perform the activity, to be received by the user interface 5 (s4.6). An example input screen is shown in FIG. 7, where the user is asked to select a distance limit d from a list or to type in or speak their own preferred distance limit. For example, a user located in a railway station who is carrying luggage may prefer a relatively small distance limit d, so that they can monitor their luggage while performing the activity, while a user who is carrying no luggage may be willing to walk a further distance in order to arrive at a suitable location.

The processing arrangement 4 then determines a size of an area $S_l$ to be searched for a suitable location for the activity. If a time period $A_u$, or urgency level, has been indicated at s4.3, or if a distance limit d has been received (s4.7), then these parameters may be used to determine the size of the search area $S_l$ (s4.8). For example, any information obtained regarding a speed of motion of the user 2 at s4.5 may be combined with the desired time period $A_u$ obtained at s4.3 to determine the size of the area (s4.9) based on how far the user 2 may travel within the desired time period. Where the user 2 has indicated a preferred distance limit d in response to s4.6, this information may be used, optionally in combination with speed of motion and time period information, to determine the size of the area at s4.8. On the other hand, if the user has not indicated a time period $A_u$, an urgency level, or a distance limit d (s4.7), then a default search area size may be set (s4.9). In this particular example, the area $S_l$ is a circular area with a radius corresponding to the size determined at s4.8 or s4.9.

Information regarding a current location l of the user 2 is then obtained (s4.10). The information may be based on output from the GPS unit 14. Alternatively, or additionally, where the device 3 is communicating using Wi-Fi, information regarding the connection point to a Wi-Fi network may be obtained to provide an indication of the current location l.

The processing arrangement 4 also determines additional parameters based on the type of activity $A_y$ indicated at s4.1. For example, the processing arrangement 4 may determine an estimated duration $A_d$ for the activity (s4.11) from a look-up table of activity types and respective estimated durations stored in the memory units of the device 3.

In this particular embodiment, the processing arrangement 4 calculates a space requirement $S_A$ (s4.12) for preserving the user's privacy during the activity. In this particular embodiment, the space requirement $S_A$ is calculated based on equation (1) as follows:

$$S_A = (A_y \times A_c) \quad (1)$$

where $A_y$ corresponds to the type of activity to be performed, indicated at s4.1 and $A_c$ is the requested privacy level received at s4.2. For example, the space required to preserve privacy of an e-mail being typed into a tablet, to prevent another person looking at the tablet screen, would be less than the space required to preserve privacy during a telephone call, to prevent the user being overheard. In this particular embodiment, the space requirement $S_A$ defines a circular area around the user 2 while the activity is performed.

The processing arrangement 4 then generates a query Q (s4.13), in which the location, time and privacy requirements are conveyed. The query has the following template:

$$Q = <U, l, S_l, A(A_y, A_u, A_d), S_A> \quad (2)$$

where U indicates the user 2. The query Q may be interpreted as "User U requires a privacy preserving space of area $S_A$, within a distance of Sl from location l in the next $A_u$ minutes, for $A_d$ minutes, to perform an activity of type $A_y$". The query Q is then sent to the server 19 via the Internet 20, or via a cellular network or other network (not shown).

In an alternative embodiment, the device 3 may transmit data received or determined in one or more of steps s4.1 to s4.10 to the server 19, so that the server 19 can generate the query Q.

The server 19 then uses the information in the query Q to query a map database 26 (s4.14). In this particular example, the map database is a multi-dimensional map database, such as the Nokia HERE Maps database. The server 19 compiles a list $L_A$ of locations $l_1, l_2, l_3 \ldots$ suitable for performing activities of type $A_y$ (s4.15).

The server 19 may rank the locations $l_1, l_2, l_3 \ldots$ according to distance from the user's current location l (s4.16). In other embodiments, the ranking may be performed by the device 3, after a list of suggested locations is received from the server 19.

If none of the locations $l_1, l_2, l_3 \ldots$ meet the requirements set out in the query Q, the server 19 or device 3 may rank the locations based on which of them meet the greatest number of the requirements, or based on which of them meet the most important of the requirements at s4.16. For example, the required privacy level may be considered to be more important that the desired time period, and a location providing the required privacy with a travel time that exceeds the desired time period might be ranked more highly than a location with less privacy having a shorter travel time.

Optionally, the server 19 may obtain further information from the databases 26, 27, 28 (s4.17) to determine which of the locations $l_1, l_2, l_3 \ldots$ would be the most suitable location for the user 2 to perform the activity. For instance, the server 19 may access real-time information for the locations $l_1, l_2, l_3 \ldots$ As an example, if the user 2 wishes to find a nearby location to type an e-mail and location $l_1$, is a public park with benches, the server 19 may obtain information regarding the current weather at location $l_1$. If the current weather information suggests that it is cloudy at location l1, this might suggest that the park would not be crowded at this time, making location $l_1$ more suitable for the planned activity. In another example, if the user is on a train, the server 19 may access real-time data indicating a number density of people in a compartment on that train, such as closed-circuit television (CCTV) footage, sensors in seating that indicate occupancy or a sensors indicating a noise level in the compartment, to determine which locations on the train might be more suitable for maintaining the user's privacy.

In another example, the server 19 may access schedule information for an event or for a transportation service, to determine whether a location is likely to be crowded. For example, the server 19 may determine that the user 2 is close to a bus terminal and that a bus is due to leave a particular stop within the terminal within the time period $A_u$, making the bus stop a suitable location for the activity after the bus has departed.

If a single location meeting all of the requirements set out in query Q cannot be identified (s4.18), the server 19 or device 3 may then determine whether combinations of the identified locations $l_1$, $l_2$ and $l_3$ may provide the requested privacy level $A_c$ for the required duration $A_d$ (s4.19), based on the requirements met by the individual locations and the time required to travel between them.

If at least one suitable location has been identified in s4.18 or s4.19, information regarding at least one most highly ranked location $l_1$ is presented to the user on the display 6 (s4.20). The information may include navigation instructions directing the user 2 to the displayed location $l_1$.

FIGS. 9, 10, 11 and 12 depict examples of information regarding the locations $l_1$, $l_2$ and $l_3$, is presented on the display 6 of the device 3.

Figure 9:
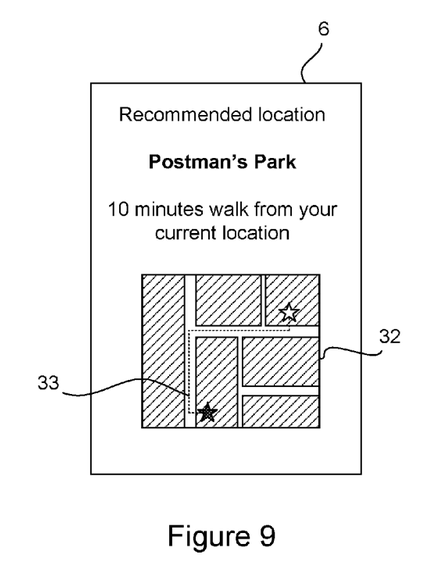
FIG. 9 depicts an example of location information that may be output by the device of FIG. 2.

FIG. 9 depicts an example in which the location $l_1$ meets all the requirements set out in query Q, and takes the form of a map 32 showing a route 33 from the current location l to the location $l_1$.

Figure 10:
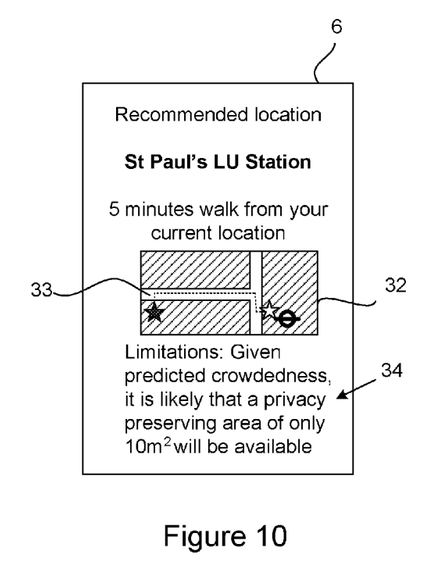
FIG. 10 depicts another example of location information that may be output by the device of FIG. 2.

FIG. 10 depicts an example in which location $l_2$ does not meet all of the requirements set out in query Q, since the space requirement $S_A$ is not met. In addition to the map 32 and route 33, comments 34 are displayed explaining the limitations of the location $l_2$.

Figure 11:
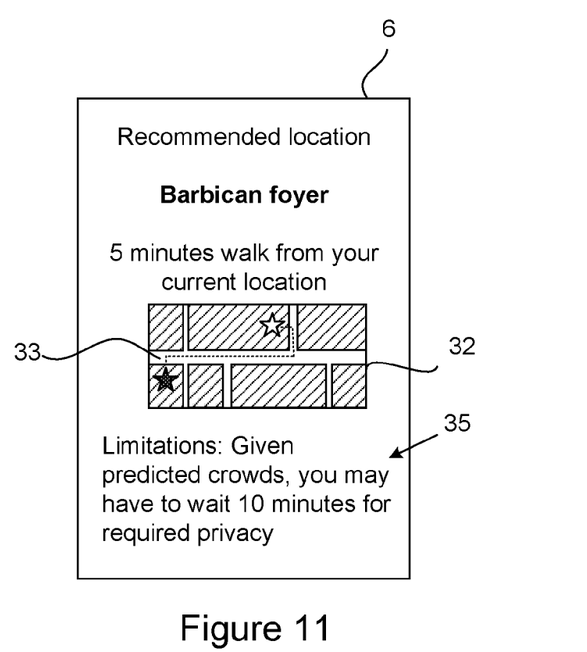
FIG. 11 depicts yet another example of location information that may be output by the device of FIG. 2.

FIG. 11 depicts an example in which location $l_3$ does not meet all of the requirements set out in query Q, since the space requirement $S_A$ is not met but, based on information regarding future conditions obtained at s4.17, it is suggested that the space requirement $S_A$ will be met soon after the desired time period $A_u$ has elapsed. In addition to the map 32 and route 33, comments 35 are displayed explaining the limitations of the location $l_3$.

Figure 12:
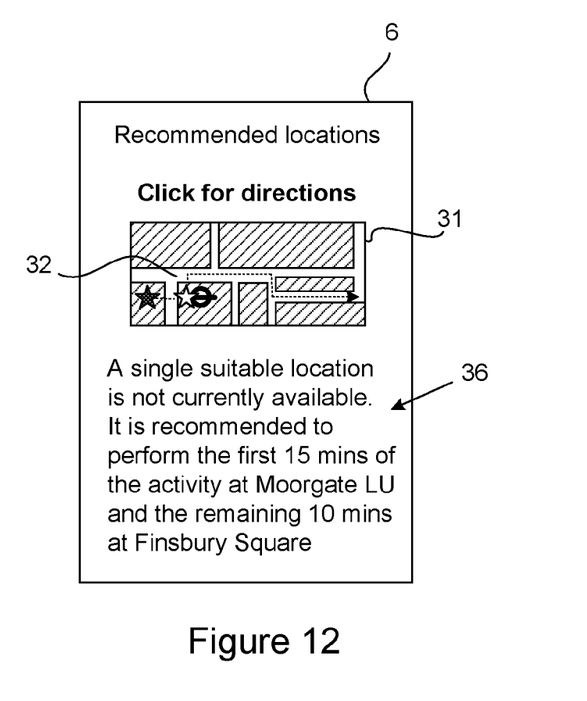
FIG. 12 depicts a further example of location information that may be output by the device of FIG. 2.

FIG. 12 depicts an example in which a combination of locations $l_4$ and $l_5$ would meet all of the requirements set out in query Q. In addition to the map 32 and route 35, comments 36 are displayed to provide an itinerary for the user 2 to perform the activity.

Optionally, the method may also include monitoring the progress of the activity (s4.21), before the method ends (s4.22). For example, where the activity relates to a task to be performed using the device 3, the device 3 may monitor the user's activity and, if necessary, update the location information presented to the user. An example of a monitoring process will now be described, with reference to FIG. 13.

Figure 13:
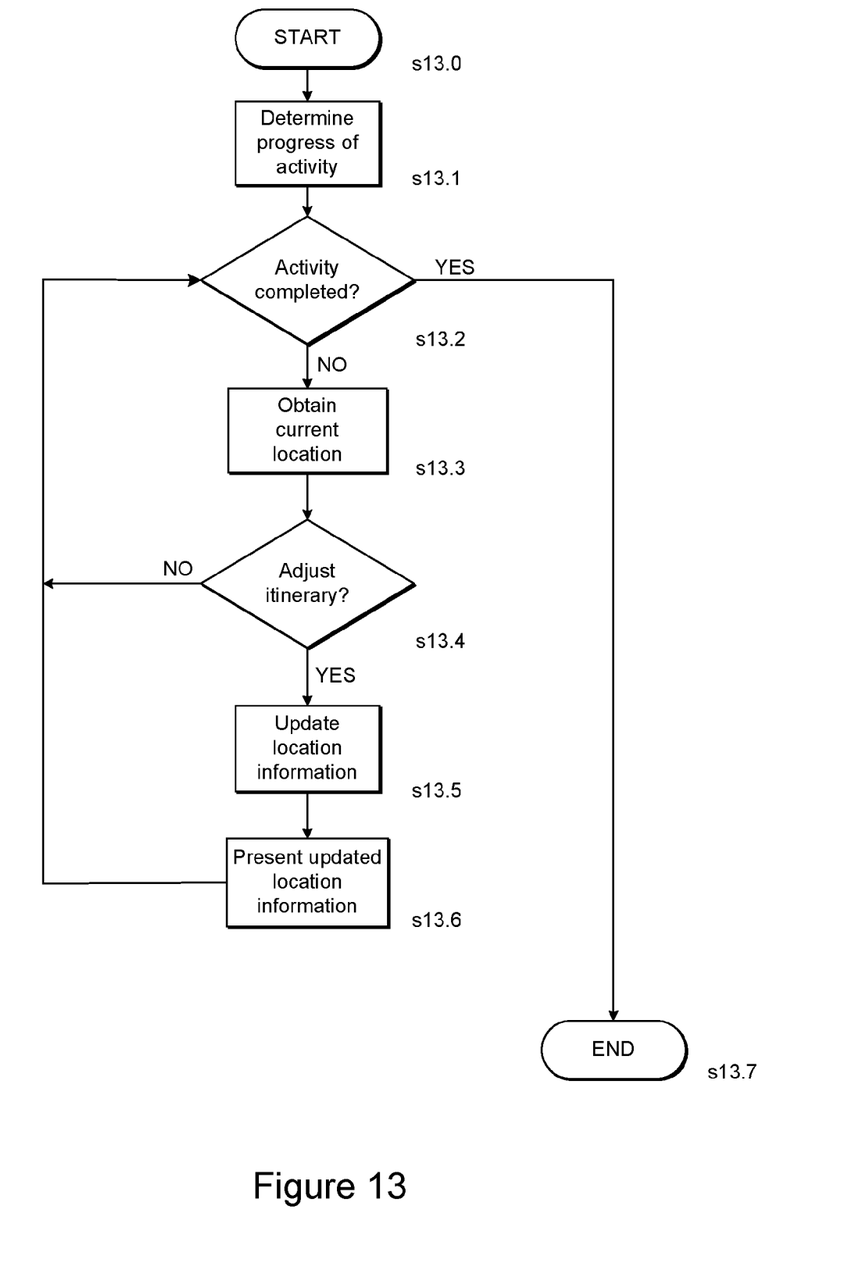
FIG. 13 is a flowchart of a monitoring procedure that may optionally be included in the method of FIG. 4.

Starting at s13.0, the processing arrangement 4 determines the progress of the task (s13.1). For example, if the activity type $A_y$ indicated at s4.1 was a telephone call, the processing arrangement 4 may monitor whether a telephone call has been made using the device 3 and, if so, whether that telephone call has ended. In another example, if the task was sending an e-mail using the device 3, then the processing arrangement 4 may determine whether an e-mail has been sent from the device 3 within a time period consistent with the location information presented at s4.20.

If the task has not yet been completed (s13.2), then the user's current location is obtained (s13.3), for example using the GPS unit 14 or other information. For example, if the device 3 is connected to a wi-fi network, the location of a wi-fi access point through which the device 3 is communicating may be used to indicate the user's current location.

The device 3 then determines whether an itinerary for the user should be adjusted (s13.4) and, if so, selects one or more new locations. For example, the processing arrangement 4 may determine whether the user has sufficient time to arrive at the one or more locations selected in s4.16 to s4.19 to carry out the activity in the required time period and, if not, may select an alternative location and update the location information accordingly (s13.5).

If the location information has been updated at s13.5, the updated location information is presented to the user (s13.6) and the processing arrangement 4 continues to monitor the progress of the activity (s13.1) until the activity has been completed (s13.2 and s13.7).

The embodiments described above are merely examples of ways in which the claimed subject matter might be implemented. It will be appreciated that the above-described embodiments are not limiting on the scope of the invention, which is defined by the appended claims and their alternatives. Various alternative implementations will be envisaged by the skilled person, and all such alternatives are intended to be within the scope of the claims. A number of example alternatives will now be described.

As noted above, certain parts of the method of FIG. 4 may be performed by a device 3 or by a server 19, depending on how the method is implemented.

If desired, the different functions discussed herein may be performed in a different order and/or concurrently with each other. Furthermore, if desired, one or more of the above-described functions may be optional or may be combined. In particular, the order in which certain actions are taken in FIGS. 4 and 13 may be varied in other embodiments. For example, the order in which the activity type $A_y$, privacy level $A_c$, time period $A_u$, or urgency, and distance limit d are requested and received and the current location l is obtained, at s4.1 to s4.10, may differ from that shown in FIG. 4. Also, the determination of the task duration $A_d$, the search area size $S_l$ and the space requirement $S_A$ may be performed at different stages and/or in a different order than shown in FIG. 4.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer.

According to various embodiments of the previous aspect of the present invention, the computer program may be implemented in a computer program product comprising a tangible computer-readable medium bearing computer program code embodied therein which can be used with the processor for the implementation of the functions described above. A computer-readable medium may comprise a computer-readable storage medium that may be any tangible media or means that can contain or store the instructions for use by or in connection with an instruction execution system, apparatus, or device, such as a computer or processing arrangement. Reference to "computer-readable storage medium", "computer program product", "tangibly embodied computer program" etc, or a "processor" or "processing circuit" etc. should be understood to encompass not only computers having differing architectures such as single/multi processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

Although various aspects of the invention are set out in the independent claims, other aspects of the invention comprise other combinations of features from the described embodiments and/or the dependent claims with the features of the independent claims, and not solely the combinations explicitly set out in the claims.

The invention claimed is:

1. A method comprising:
   receiving an indication of an activity to be performed by a user;
   obtaining an indication of a current location of the user;
   transmitting, to a server, information relating to an area in which the location for the activity is to be identified, said information including the current location, and one or more criteria relating to at least one of: a type of the activity or a level of privacy for the activity;
   receiving, from the server, location information identifying one or more candidate locations for the activity;
   presenting information identifying at least one of said one or more candidate locations to the user;
   determining whether the activity has been completed;
   if the activity has not been completed, obtaining an updated current location for the user;
   determining whether the one or more candidate locations should be changed, based on said current location and a time period for completing the activity; and
   if it is determined that the one or more candidate locations should be changed, determining one or more new candidate locations and presenting updated location information identifying the one or more new candidate locations to the user.

2. The method according to claim 1, wherein said transmitting comprises:
   generating a query including said information; and
   transmitting said query to the server.

3. The method according to claim 1, wherein said one or more criteria further includes an urgency for performance of the activity by the user.

4. The method according to claim 3, wherein said urgency is based on a received indication for a time period for performance of the activity, the method further comprising:
   determining a current speed of motion or a form of transport being used by the user; and identifying said area based on the desired time period and the determined current speed of motion or form of transport.

5. The method according to claim 1, wherein said transmitted information includes at least one of an indication of a time period for performance of the activity or a distance limit from the current location.

6. The method according to claim 1,
   wherein said presenting information comprises presenting a comment regarding one of the one or more criteria that is not met by the at least one candidate location.

7. The method according to claim 1, comprising:
   receiving, from the server, at least two candidate locations that collectively meet the one or more criteria;
   wherein said presenting information comprises presenting comments regarding parts of the predetermined activity that can be performed at each of the at least two candidate locations, based on the one or more criteria met individually by the at least two candidate locations.

8. The method according to claim 1, wherein the activity involves the user communicating information to another individual and the one or more candidate locations are locations where the user may conduct the activity without risking a loss of confidentiality of the user communicated information.

9. The method according claim 8, wherein the user communicated information is communicated via at least one of e-mail or a telephone call.

10. An apparatus, comprising:
    at least one processor and at least one memory, the at least one memory including computer-readable code which, when executed by the at least one processor, causes the apparatus to perform:
    receiving an indication of an activity to be performed by a user;
    obtaining an indication of a current location of the user;
    transmitting, to a server, information relating to an area in which the location for the activity is to be identified, said information including the current location, and one or more criteria relating to at least one of: a type of the activity or a level of privacy for the activity;
    receiving, from the server, location information identifying one or more candidate locations for the activity;
    presenting information identifying at least one of said one or more candidate locations to the user;
    determining whether the activity has been completed;
    if the activity has not been completed, obtaining an updated current location for the user;
    determining whether the one or more candidate locations should be changed, based on said current location and a time period for completing the activity; and
    if it is determined that the one or more candidate locations should be changed, determining one or more new candidate locations and presenting updated location information identifying the one or more new candidate locations to the user.

11. The apparatus according to claim 10, wherein said transmitting comprises:
    generating a query including said information; and
    transmitting said query to the server.

12. The apparatus according to claim 10,
    wherein said one or more criteria further includes an urgency for performance of the activity by the user.

13. The apparatus according to claim 12,
    wherein said urgency is based on a received indication for a time period for performance of the activity, and
    wherein the computer-readable code, when executed by the at least one processor, causes the apparatus to perform:

determining a current speed of motion or a form of transport being used by the user; and identifying said area based on the desired time period and the determined current speed of motion or form of transport.

14. The apparatus according to claim 10, wherein said transmitted information includes at least one of an indication of a time period for performance of the activity or a distance limit from the current location.

15. The apparatus according to claim 10, wherein said presenting information comprises presenting a comment regarding one of the one or more criteria that is not met by the at least one candidate location.

16. The apparatus according to claim 10, wherein the computer-readable code, when executed by the at least one processor, causes the apparatus to perform:

receiving, from the server, at least two candidate locations that collectively meet the one or more criteria; and wherein said presenting information comprises presenting comments regarding parts of the predetermined activity that can be performed at each of the at least two candidate locations, based on the one or more criteria met individually by the at least two candidate locations.

17. The apparatus according to claim 10, wherein the activity involves the user communicating information to another individual and the one or more candidate locations are locations where the user may conduct the activity without risking a loss of confidentiality of the user communicated information.

18. The apparatus according claim 17, wherein the user communicated information is communicated via at least one of e-mail or a telephone call.

19. A computer program product comprising at least one non-transitory computer-readable memory medium having computer-readable code stored thereon, the computer-readable code being configured to, when executed by a processor, cause an apparatus to perform:

receiving an indication of an activity to be performed by a user;

obtaining an indication of a current location of the user;

transmitting, to a server, information relating to an area in which the location for the activity is to be identified, said information including the current location, and one or more criteria relating to at least one of: a type of the activity or a level of privacy for the activity;

receiving, from the server, location information identifying one or more candidate locations for the activity;

presenting information identifying at least one of said one or more candidate locations to the user;

determining whether the activity has been completed;

if the activity has not been completed, obtaining an updated current location for the user;

determining whether the one or more candidate locations should be changed, based on said current location and a time period for completing the activity; and if it is determined that the one or more candidate locations should be changed, determining one or more new candidate locations and presenting updated location information identifying the one or more new candidate locations to the user.

20. The computer program product according to claim 19, wherein said transmitting comprises:

generating a query including said information; and transmitting said query to the server.

21. The computer program product according to claim 19, wherein said one or more criteria further includes an urgency for performance of the activity by the user.

22. The computer program product according to claim 21, wherein said urgency is based on a received indication for a time period for performance of the activity, and wherein the computer-readable code is further configured to, when executed by the at least one processor, cause the apparatus to perform:

determining a current speed of motion or a form of transport being used by the user; and identifying said area based on the desired time period and the determined current speed of motion or form of transport.

23. The computer program product according to claim 19, wherein said transmitted information includes at least one of an indication of a time period for performance of the activity or a distance limit from the current location.

24. The computer program product according to claim 19, wherein said presenting information comprises presenting a comment regarding one of the one or more criteria that is not met by the at least one candidate location.

25. The computer program product according to claim 19, wherein the computer-readable code is further configured to, when executed by the at least one processor, cause the apparatus to perform:

receiving, from the server, at least two candidate locations that collectively meet the one or more criteria; and wherein said presenting information comprises presenting comments regarding parts of the predetermined activity that can be performed at each of the at least two candidate locations, based on the one or more criteria met individually by the at least two candidate locations.

26. The computer program product according to claim 19, wherein the activity involves the user communicating information to another individual and the one or more candidate locations are locations where the user may conduct the activity without risking a loss of confidentiality of the user communicated information.

27. The computer program product according claim 26, wherein the user communicated information is communicated via at least one of e-mail or a telephone call.

* * * * *